United States Patent
Rothe et al.

[11] Patent Number: 5,806,828
[45] Date of Patent: Sep. 15, 1998

[54] CHAIR WITH A SEAT THAT RETURNS TO A PREDETERMINED HEIGHT AND ANGULAR REST POSITION WHEN UNOCCUPIED

[75] Inventors: Wolfgang Rothe, Windhagen; Klaus Koch, Dahlheim; Michael Hewel, Boppard; Oliver Schüttler, Monreal, all of Germany

[73] Assignee: Stabilus GmbH, Koblenz, Germany

[21] Appl. No.: 691,979

[22] Filed: Aug. 2, 1996

[30] Foreign Application Priority Data

Aug. 4, 1995 [DE] Germany .................. 195 28 645.6

[51] Int. Cl.⁶ ............................................. F16M 13/00
[52] U.S. Cl. ................................ 248/631; 297/344.19
[58] Field of Search ....................... 248/631, 406.2, 248/406.1, 161, 158; 297/344.19

[56] References Cited

U.S. PATENT DOCUMENTS

| | | | |
|---|---|---|---|
| 4,756,496 | 7/1988 | Hosan et al. | 248/631 |
| 4,817,898 | 4/1989 | Locher | 248/631 |
| 4,828,080 | 5/1989 | Locher | 248/161 |
| 4,979,718 | 12/1990 | Bauer et al. | 248/631 |
| 5,078,351 | 1/1992 | Gualtieri | 248/125.1 |

FOREIGN PATENT DOCUMENTS

| | | | |
|---|---|---|---|
| 1757273 | 8/1957 | Germany . | |
| 1982567 | 11/1965 | Germany . | |
| 2031057 | 4/1980 | United Kingdom | 248/631 |
| 9505953 | 3/1995 | WIPO . | |

Primary Examiner—Leslie A. Braun
Assistant Examiner—Kimberly Wood
Attorney, Agent, or Firm—Nils H. Ljungman and Associates

[57] ABSTRACT

Height adjustable object carrier column for use as a chair column of a revolving chair. The head area of the chair is moved back to a rest height and angular orientation with respect to the foot area of the chair upon relief of the chair load. The head area can be adjusted with respect to the foot area, by height adjustment apparatus, to different rest heights. Height adjustment is provided in the form of a hydraulic or a hydropneumatic or a spring-hydraulic or a pneumatic actuator with a cylinder assembly and a piston rod assembly which are coaxial to a telescope axis. The height adjustment apparatus includes internal biasing structure and first arbitrarily adjustable and second automatic blocking devices, whereby following a reduction of the load on the object carrier column, the second blocking device is released, and the height adjustment apparatus is moved toward a specified limit position, and the stop moves the object carrier column into the specified rest angular orientation.

16 Claims, 9 Drawing Sheets

5,806,828

CHAIR WITH A SEAT THAT RETURNS TO A PREDETERMINED HEIGHT AND ANGULAR REST POSITION WHEN UNOCCUPIED

BACKGROUND OF THE INVENTION

1. Field of the Invention

The present invention relates to an object carrier column as typically used for a chair column of an office chair. The object carrier column includes a foot area and a head area connected by telescoping tubes that allow adjustment of seating height. The head area can rotate freely about the foot area, allowing a chair user to rotate the chair seat to any desired rotational position. Upon the chair user leaving the chair, the object carrier column rotates the chair seat back to an initial angular position.

2. Background Information

Similar known object carrier columns are used in particular as chair columns, the purpose of which is to allow the user seated on the chair seat to rotate the seat with respect to the foot area of the column, so that the user can assume a comfortable rotational position, and so that the seat rotates back to an initial position when the user leaves the seat. In this manner, the seats, in particular if they are not rotationally symmetrical, always return to an initial position which is best-suited to the layout of the room, optically and functionally, e.g. for purposes of cleaning. For example, if a number of revolving chairs are located in a conference room or at a bar, all the revolving chairs or stools which are unoccupied will rotate back into the specified initial position, and thereby give the room a neat and orderly appearance.

A known object carrier column has been used in Germany. In this regard, reference is made to FIG. 7. FIG. 7 shows a vertical tube 10*g* which is welded, for example, to three vertical feet 14*g*. The vertical tube 10*g* has a support base 16*g* which is non-rotationally connected to the vertical tube 10*g* by crimping the bottom edge of the vertical tube 10*g*. A rod 120*g* is non-rotationally supported on the support base 16*g*. This rod 120*g* has, on its upper end, a stop hub 122*g* which is non-rotational with respect to the rod 120*g*. The stop hub 122*g* is non-rotational and is fixed in place axially, and is connected to the bar 120*g* by means of a splint 124*g*. The stop hub 122*g*, on its lower end, has a inclined surface 126*g*.

A guide lining 128*g* is inserted non-rotationally into the upper end of the vertical tube 10*g*. Between this guide lining 128*g* and the stop hub 122*g* there is a telescoping tube 130*g* which is guided so that it can rotate and move axially. On the outside of the telescoping tube 130*g*, a counter stop hub 132*g* is attached so that it is non-rotational and axially immovable, where it is fastened by a splint 134*g*. The counter stop hub 132*g* has an inclined surface 136*g* which faces the inclined surface 126*g*. Below the telescoping tube 130*g*, the rod 120*g* is surrounded by a coil compression spring 138*g* which is supported by means of a support bearing 20*g* on the support base 16*g*. The coil compression spring 138*g* is thereby held separate from the bar 120*g* and is centered by a guide sleeve 140*g*.

The coil compression spring 138*g* is in contact under the application of a bias against a crimped edge 142*g* on the lower end of the counter stop hub 132*g*. The upper end of the telescoping tube 130*g* is realized in the form of a mating cone 152*g*, to which a seat carrier plate 88*g* can be attached. The inclined surfaces 136*g* and 126*g* are in contact with one another under the pressure of the coil compression spring 138*g*, so that a rotation of the seat 88*g* with respect to the vertical tube 10*g* is not possible, or to be more precise, such a rotation is possible only when the coil compression spring 138*g* is compressed.

If a person's weight is resting on the seat carrier plate 88*g*, the telescoping tube 130*g* is pushed backward and is accompanied by the compression of the coil compression spring 138*g*, so that the inclined surfaces 126*g* and 136*g* are held at a distance from one another. In that case, the telescoping tube 130*g* with the stop hub 132*g* can rotate freely with respect to the rod 120*g* which is non-rotationally supported on the vertical tube 10*g* and the stop hub 122*g* which is non-rotationally fastened to this rod 120*g*. When the load on the seat carrier plate 88*g* is removed, the inclined surfaces 126*g* and 136*g* are once again placed in mutual contact, and generate a torque around the axis A until the coil compression spring 138*g* is expanded to the maximum. At that point an initial angular position is reached in which the telescoping tube 130*g* and thus the seat carrier plate 88*g* cannot be unintentionally rotated.

In its initial position, the chair column illustrated in FIG. 7 cannot be adjusted to different heights.

German Utility Model No. 17 57 273 describes a return device on a chair which is capable of rotation only to a very limited extent. As explained in the portion of the description which accompanies the illustrations, the rotational travel is a function of the load, and the rotational distance or rotational capability tends to increase proportionally as the load increases. An additional disadvantage of this chair is that its height can be adjusted only to a very limited extent. To adjust the height of the seat, the user must get out of the chair and change the setting of the bushing parts 2 and 3 relative to one another. The spring bias of the coil spring 8 which is responsible for the return movement is thereby adjusted. There is no guarantee that the return function will operate correctly when the chair is in the lowered position.

German Utility Model No. 19 82 567 also describes a known revolving chair with a vertical column and a seat surface which rotates back into an initial position. The use of the term "revolving chair" is misleading, however, because according to the description which accompanies the figures, depending on the setting of the spring 24, the seat can be rotated either 360° or only from 0° to 180°. It should also be noted that the user has to get out of the seat to rotate it. The height adjustment function is also altogether unsatisfactory. To adjust the height of the seat, the knurled nut 5 must be loosened, during which process the user has to hold the seat in position to make certain that the telescoping inner tube does not slide directly into the vertical tube.

On many other known chair columns, the height of the seat can be made adjustable, so that the height of the seat can be adjusted to meet the requirements of the current user. Pneumatic springs are frequently used for this purpose which make possible an automatic height adjustment and a locking of the seat at the desired height. These pneumatic springs or other fluid height adjustment devices generally take up a significant amount of axial and radial space. Therefore, it is little wonder that it has not heretofore been considered possible to incorporate a height adjustment device in a chair column like the one illustrated in FIG. 7, in addition to the return rotation device illustrated in FIG. 7.

OBJECT OF THE INVENTION

The object of the present invention is to create an object carrier column of the type described above so that not only does it rotate back into an initial angular position when the user leaves the seat, but the height of the seat can also be adjusted to suit the requirements of the current user.

SUMMARY OF THE INVENTION

The present invention teaches that this object can be accomplished by incorporating two independent blocking means for limiting compression of the support column upon a support load being applied. The second blocking means are advantageously connected in parallel to the first blocking means and are disabled when the second blocking means clears spontaneously when the support load is removed.

The height adjustment, in connection with the automatic return rotation, represents a major advantage because the chairs or stools in a room which is furnished with a plurality of chairs or stools can return automatically, after a more or less brief delay period, to an orderly arrangement which is favorable in terms of presenting an orderly appearance and for more practical purposes such as cleaning, regardless of the position in which the individual chairs or seats were left by their most recent users. It is thereby altogether essential that the user need not do anything to have the chair return to the specified rest position of the object carrier column.

The invention teaches that the second blocking means are advantageously connected in parallel to the first blocking means. The first blocking means are thereby disabled when the second blocking means clear spontaneously.

For that purpose, the second blocking means include a friction-actuated, axially-movable control ring inside a control groove, which control groove controls a flow connection between the two work chambers as a function of the direction of the load.

In one advantageous embodiment, the control ring has a notch, by means of which, in the opened position of the control ring, the two work chambers are connected to one another. Alternatively, the control ring can be realized in the form of a piston ring. The result of such a configuration is an advantage in terms of the space occupied by the piston, which can be used, for example, to increase the stroke of the actuator.

In that case, the piston ring can be located inside a graduated piston ring groove, whereby the larger diameter of the piston ring groove with the piston ring blocks the connection between the two work chambers, and when there is a relative movement between the guide tube and the piston ring as a result of the application of a load, the piston ring is moved from the larger diameter to the smaller diameter of the piston ring groove.

To assure that an object carrier column has a rotational capability in connection with a low friction force, the invention teaches that two stop means units are used, one of which is located inside the actuator, and the other of which is effectively located between the piston rod and the foot area. The orientation between the foot area and the piston rod on one hand, and on the other hand the orientation between the piston rod and the pressure cylinder, are thereby achieved by means of a stop means unit.

In an alternative embodiment, the first stop means can be effectively connected to the vertical tube and the second stop means can be effectively connected to the pressure cylinder. In a consistent extension of the principle, the first stop means are located in a ring-shaped chamber which is formed by a guide lining and the vertical tube.

As shown in FIG. 7 indicated above, it is preferable if at least one of the torque-generating surfaces is inclined with respect to an axially normal reference surface in the peripheral direction around the telescope axis.

But, it is also possible, that between the head area and the foot area, there can be axial support means which restrict the axial movement of the head area with respect to the foot area when a load is exerted on the head area. In that case, the cushioning function of the axially-acting return means is suppressed. This cushioning function, if desired, can also be provided in the vicinity of the seat carrier plate or elsewhere.

To make the rotation of the head area with respect to the foot area as smooth as possible, measures can be provided like those indicated in FIG. 7, in which there are roller bearing means between the head area and the foot area which transmit an axial load from the head area to the foot area.

Another preferable embodiment is one in which the return means which transmit the axial force can be supported on a support base which is axially non-detachably and non-rotationally connected to the base area, and that one of the two assemblies—i.e. the piston rod assembly and the cylinder assembly—is supported on the return means which transmit the axial force, while the other of the two assemblies is connected axially immovably to the head area.

A particularly short construction can be obtained if the first stop means are non-rotationally fastened to an underside of the support base, the one assembly has an extension which is non-rotational relative to it, which extension runs through the retaining means which transmit the axial force, and the support base, the first stop means, and the second stop means are non-rotationally attached to this extension below the first stop means. A pivot bearing which transmits the axial force can thereby be located between the upper end of the retaining means which transmit the axial force and the one assembly. A coil compression spring can be used as the retaining means which transmit the axial force.

To make it possible to easily select the height adjustment of a seat which is attached to the column, the present invention teaches that on an upper end of the cylinder assembly, there is a release element which is used to initiate a relative movement between the piston rod assembly and the cylinder assembly.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

The corresponding foreign patent publication applications, namely, Federal Republic of Germany Patent Application No. 195 28 645.6, filed on Aug. 4, 1995, having inventors Wolfgang Rothe, Klaus Koch, Michael Hewel, and Oliver Schüttler, and DE-OS 195 28 645.6 and DE-PS 195 28 645.6, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

BRIEF DESCRIPTION OF THE DRAWINGS

The accompanying figures show an example chair in which the present invention may be used and illustrate the present invention in the form of embodiments, and also illustrate a known similar device, wherein.

DESCRIPTION OF THE PREFERRED EMBODIMENT

Figure 8:
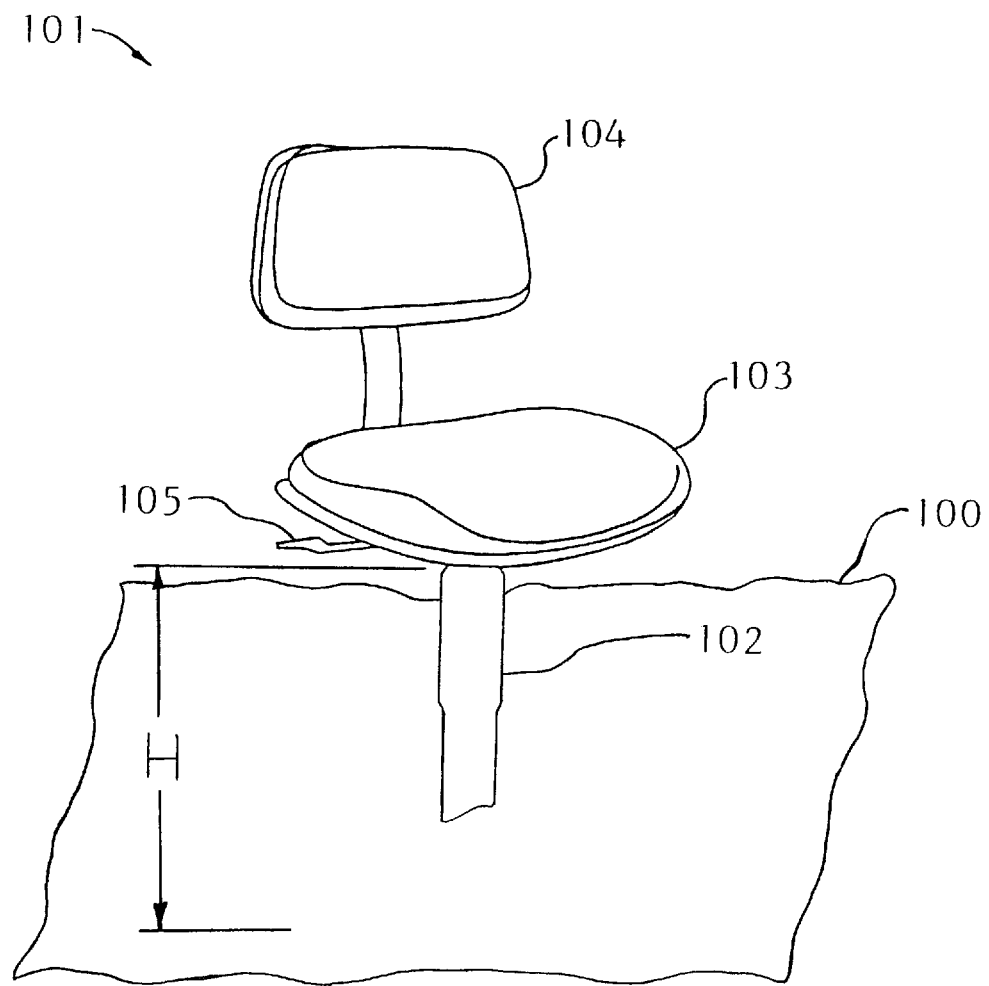
FIG. 8 shows schematically a chair in which the present invention may be incorporated.

FIG. 8 shows an example of a chair in which the present invention could be incorporated. Shown in FIG. 8 is a chair 101. The chair 101 has a seat 103 which can rotate via a chair column 102. The seat 103 has a seat back 104. The chair column 102 supports the seat 103 above the floor 100, the unoccupied height of the chair 101 indicated by the dimension H. The chair column 103 can be fastened to the floor 100 in a variety of methods not shown here, including, but not limited to, bolting the chair column 103 directly to the floor 100 or attachment to a chair base.

The seating height of the chair 101 can be adjusted by the user, to fit individual needs, by actuation lever 105. The actuation lever 105 can engage a fluid spring mechanism, such as for example, a hydraulic actuator, a hydropneumatic actuator, a spring-hydraulic actuator, or a pneumatic actuator. Upon sitting in the chair 101, the weight of the user can cause the seat 103 to displace axially toward the floor 100. The chair column 102 can act as a spring and axially shorten, with operating fluid within the actuator being compressed by the weight of the user. Upon the user leaving the chair 101, the fluid spring mechanism can decompress and help return the chair 101 to its original unoccupied height.

Figure 9:
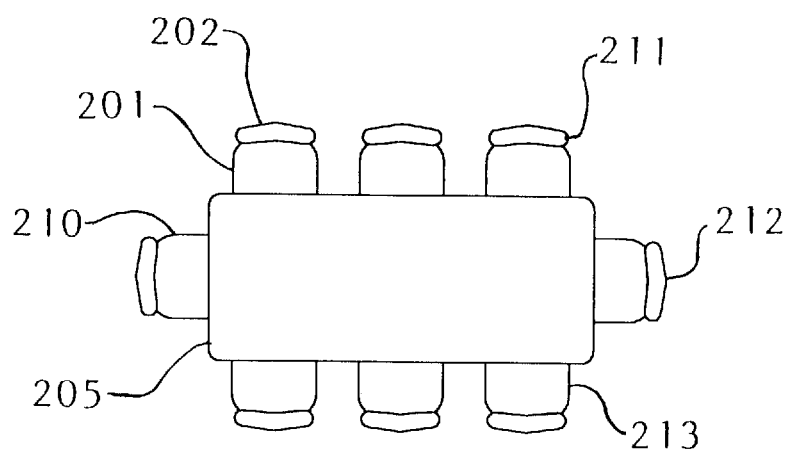
FIG. 9 shows schematically a chair arrangement in which the present invention may be incorporated.

FIG. 9 shows an arrangement of chairs 201 with seat backs 202 in which the present invention could be incorporated. The chairs 201 are arranged about the periphery of a conference table 205. To have a neat and orderly appearance, it is desirable to have each of the chairs 201 return to a predetermined angular orientation with respect to the table 205 when the chairs 201 are unoccupied. For example, as shown in FIG. 9 it would be advantageous, for neatness, orderly appearance, easier cleaning, etc., for the chairs 201 to be able to automatically rotate so that each of the seat backs 202 would face the conference table 205. The chairs 201 are required to automatically rotate to four predetermined angular orientations when unoccupied to face the conference table 202, shown by the angular positions of chairs 210, 211, 212 and 213. However, it would also be advantageous for each of the chairs 201 to be individually height-adjustable, to accommodate the wide variety of persons that might make use of a conference table 205. It would also be advantageous that the chairs 201 each return to a uniform height when unoccupied to maintain a desired neat and orderly appearance.

Figure 10:
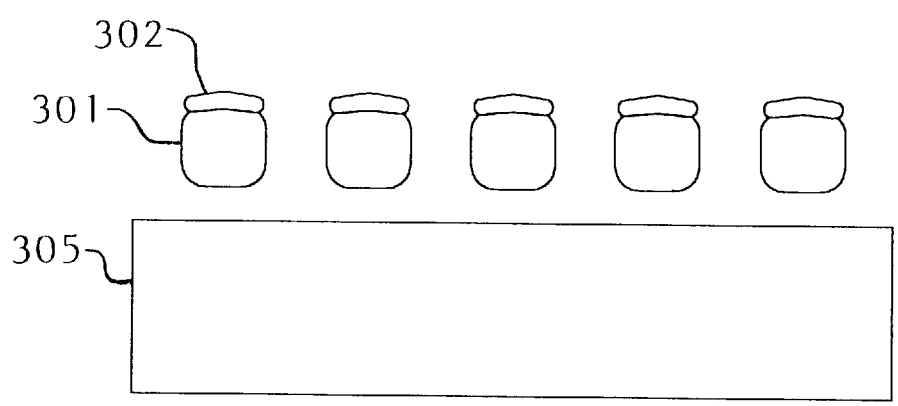
FIG. 10 shows schematically another chair arrangement in which the present invention may be incorporated.

FIG. 10 shows another arrangement of chairs 301 with seat backs 302 in which the present invention could be incorporated. The chairs 301 are arranged along an edge of a horizontal surface 305. The horizontal surface 305 could represent the counter of a bar or restaurant. In the example shown it would be desirable, for neatness, orderly appearance, easier cleaning, etc., for each of the chairs 301 to automatically rotate so that each of the seat backs 302 would face the surface 305. It would again be advantageous for each of the chairs 301 to be individually height-adjustable, to accommodate the wide variety of persons that might make use of a bar or restaurant. It would also be advantageous that the chairs 301 each return to a uniform height when unoccupied to maintain a desired neat and orderly appearance.

Figure 1:
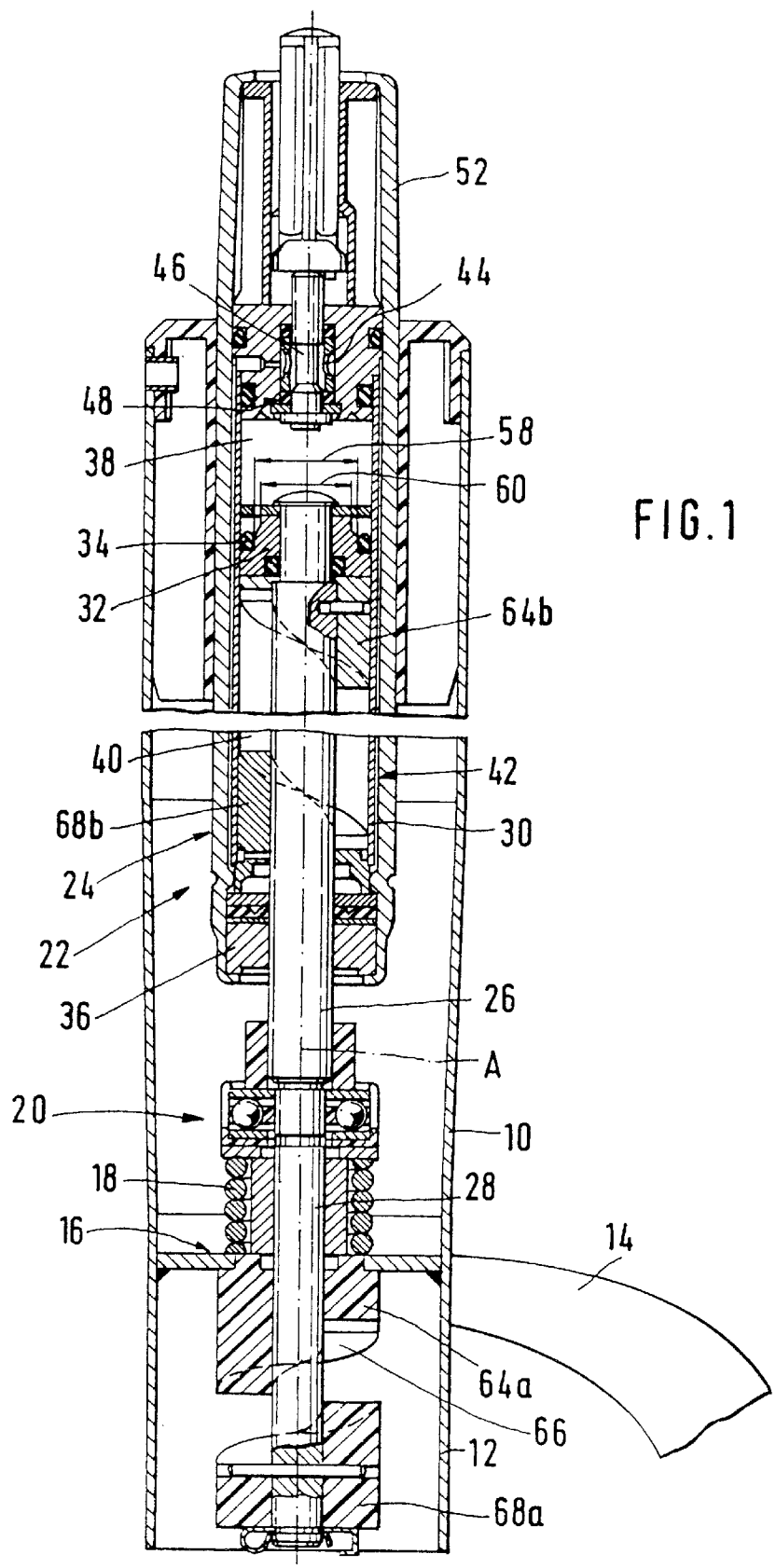
FIG. 1 shows an object carrier column which has a pivot bearing and two stop means units.

FIG. 1 shows a vertical tube 10. The vertical tube 10 has a foot area 12. In the foot area 12, there are chair feet 14 indicated schematically which can be welded to the vertical tube 10. The chair feet 14 can be realized so that the chair feet 14 will stand on a floor (not shown). A support base 16 can be welded into the vertical tube 10. A roller bearing 20 is supported on the support base 16 by means of a return spring 18. A pneumatic spring 22 is supported in the vertical tube 10 above the roller bearing 20. The pneumatic spring 22 can include a pressure cylinder 24 and a piston rod 26 which has a piston rod extension 28.

Inside the pressure cylinder 24 there is a guide tube 30. Inside the guide tube 30 there is a piston (or work piston) 32 which can move in the longitudinal direction of the guide tube 30, and is sealed with respect to the guide tube 30 by a piston gasket 34. The work piston 32 is connected to the piston rod 26. The piston rod 26 is preferably introduced in a sealed manner into the guide tube 30 from below the guide tube 30 through a bottom wall 36. The work piston 32, inside the guide tube 30, can separate two work chambers, a first work chamber 38 and a second work chamber 40 from one another. The two work chambers, the first work chamber 38 and the second work chamber 40, are preferably filled with a high pressure gas such as nitrogen.

The two work chambers, a first work chamber 38 and a second work chamber 40, are connected beyond the work piston 32 by a ring-shaped bypass line 42. In the bypass line 42, as a first blocking means which can be actuated as desired, there can be a check valve 44 which makes it possible to open or close a connection of the bypass line 42 with the work chamber 38. The check valve 44 can include a valve tappet neck 46 which interacts with a valve gasket 48. The check valve 44 can be closed by the gas pressure in the work chamber 38, and can be opened by an actuator lever 105.

When the check valve 44 is closed, the position of the piston rod or valve tappet neck 46 and the position of the work piston 32 with respect to the guide tube 30 can be determined by the volumes of compressed gas which are separated from one another in the work chambers 38 and 40 whereby, depending on the level of the gas pressures, a cushioning movement of the piston rod 26 relative to the guide tube 30 can be possible. When the check valve 44 is open, the piston rod 26 is extended downward under the effect of the pressure which is exerted on the piston rod cross section; or in other words, if the piston rod 26 is considered stationary, the pressure cylinder 24 moves upward with respect to the piston rod 26. When the check valve 44 is closed again, a new longitudinal setting of the pneumatic spring 22 is reached. The length of the pneumatic spring 22 can also be shortened, when the check valve 44 is open, by pushing the pressure cylinder 24 downward relative to the piston rod 26, which is held stationary. Overall, the check valve 44 represents a first blocking means which can be actuated as desired. Attached to the upper end of the pressure cylinder 24 can be a cone 52, which can, for example, be used to guide a seat holder (not shown).

The chair column illustrated in FIG. 1 is designed so that the seat can preferably be rotated around an axis A by the amount desired by the user, but then returns to a defined starting angular position around the axis A when the user leaves the seat and no longer exerts any force or torque on the seat.

To achieve this objective, on the underside of the support base 16 there can be a stop means unit which can have a first stop ring 64a and an inclined surface 66 attached non-rotationally, and on the piston rod extension 28 there can be also a second stop ring 68a with an inclined surface 70. The second stop ring 68a with the inclined surface 70 is illustrated in detail in FIGS. 2 and 3, whereby FIG. 3 is a cross section along Line III—III in FIG. 2.

The first stop ring 64a is non-rotationally attached to underside of the support base 16, and the second stop ring 68a is non-rotationally attached to the piston rod extension 28.

The first stop ring 64a is realized in a corresponding manner. The two stop rings, the first stop ring 64a and the second stop ring 68a, are preferably manufactured from a hard plastic, whereby the coefficient of friction of the inclined surfaces 66 and 70 relative to one another can be very low. When the head area or cone 52 is free of a load directed downward exerted by the person seated on the chair, the inclined surfaces 66 and 70 can be in contact with one another under the action of the coil compression spring 18, which attempts to push the roller bearing 20 and the pneumatic spring 22 upward. Then, as a result of the interaction of the inclined surfaces 66 and 70, a torque can be applied to the piston rod extension 28, so that the piston rod extension 28, and along with it the piston rod 26, assume a specified initial angular position with respect to the foot area 12.

To further rotate the pressure cylinder 24 (and thereby the seat 103) with respect to the piston rod 26 and thereby with respect to the vertical tube 10, a second stop means unit can be used. The second stop means unit can engage after the first stop unit engages, to rotate the seat 103 to a predetermined angular rest orientation with respect to the vertical tube 10.

Figure 1A:
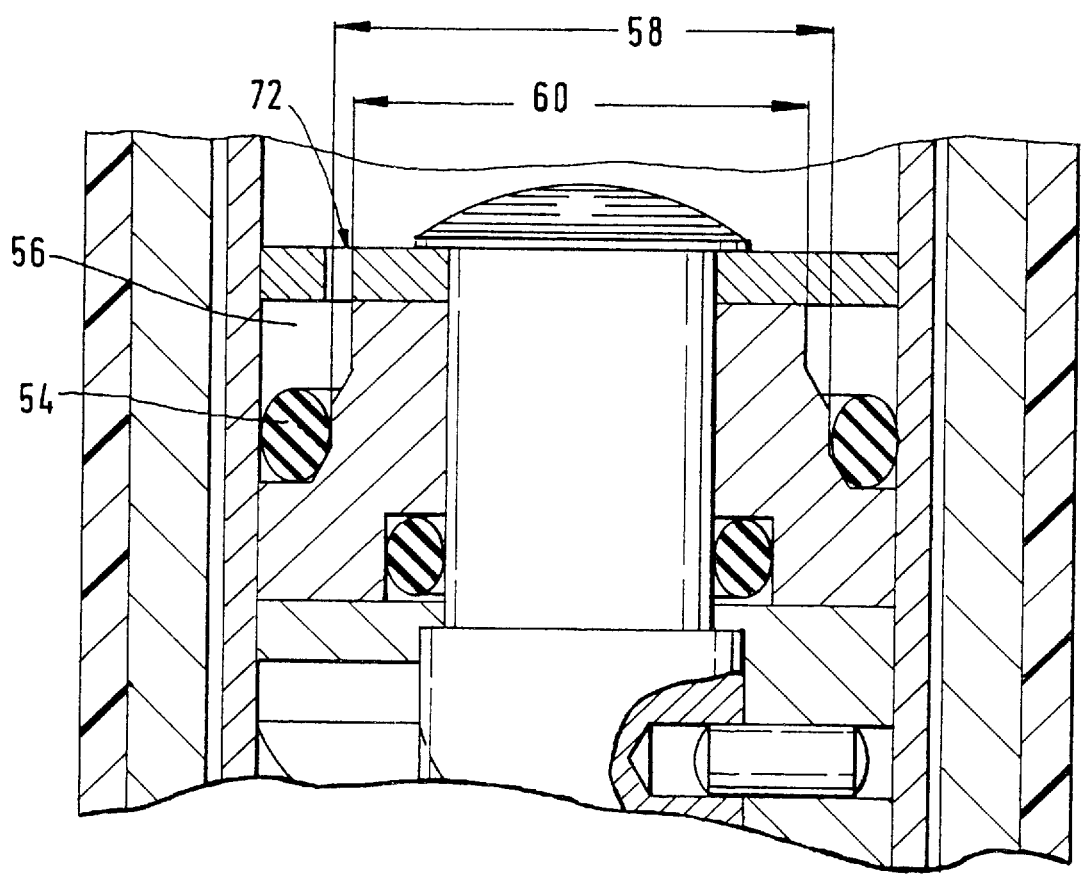
FIG. 1A is a detail of the working piston illustrated in FIG. 1.

Before the second stop means unit, including a first stop ring 64b and a second stop ring 68b, can engage, the pneumatic spring 22 must assume a specified extended position, in general preferably the maximum extended position. For that purpose, there can be second blocking means (see also FIG. 1A) on the work piston 32 in the form of a friction-actuated, axially movable control ring 54 (see also FIG. 1A) inside a control groove 56. This control groove 56 is preferably realized in the form of a piston ring groove 56, whereby the control ring 54 preferably functions simultaneously as a piston ring 54. This piston ring 54 is under the radial bias applied by the guide tube 30, as a result of which there is an effective friction force between the piston ring 54 and the guide tube 30. As a function of the relative movement between the piston 32 or the piston rod 26 and the guide tube 30 or the pressure cylinder 24 respectively, the piston ring 54 executes an axial movement inside the graduated piston ring groove 56. If, when a load is applied, the pressure cylinder 24 is pushed into the vertical tube 10, the friction force of the guide tube 30 pulls the piston ring 54 onto the large diameter 58 of the piston ring groove 56. The piston ring 54 is then biased against the inside diameter of the guide tube 30 and against the outside diameter of the piston 32, and thereby preferably hermetically seals a throttle passage boring 72 in the work piston 32.

When the pressure cylinder 24 is relieved, it relaxes somewhat under the action of the compressed gas in the work chamber 38. This relaxation movement of the pressure cylinder 24 is preferably sufficient to displace the piston ring 54 by the action of the friction between the guide tube 30 and the piston ring 54 from the large diameter 58 to the small diameter 60 of the piston ring groove 56. The bias which presses the piston ring 54 against the inside diameter of the guide tube 30 is preferably thereby eliminated, and the piston ring 54 opens the connection between the two work chambers, the first work chamber 38 and the second work chamber 40, via the throttle passage boring 72. Consequently, the gas charge which is under pressure can produce an extension movement of the piston rod 26 out of the pressure cylinder 24.

At the end of the extension stroke, the second stop means unit with the first stop ring 64b and the second stop ring 68b, which preferably orients the pressure cylinder 24 with respect to the piston rod 26 and the piston rod extension 28, is engaged. As described above, the piston rod extension 28 is oriented with respect to the vertical tube 10 by the first stop means unit, first stop ring 64a and second stop ring 68a. Consequently, the pressure cylinder 24 is preferably oriented relative to the vertical tube 10 by means of the two stop means units (i.e., the first stop means including the first stop ring 64a and the second stop ring 68a, and the second stop means including the first stop ring 64b and the second stop ring 68b) which are preferably connected in series, and the pressure cylinder 24 assumes its angular rest position.

Once this angular position has been reached, the seat 103 remains in this angular position, because a rotation of the seat 103 (non-rotatively attached to the pressure cylinder 24) with respect to the base area 12 would result in a compression of the coil compression spring 18 as a result of the slope of the inclined surfaces 66 and 70.

On the other hand, if the weight of a person is applied to the seat 103, the pneumatic spring 22 is pushed downward in its entirety against the action of the coil compression spring 18, whereby the coil compression spring 18 is compressed. In that case, the situation illustrated in FIG. 1 occurs, in which the inclined surfaces 66 and 70 are separated from one another. In that case, the pneumatic spring 22, by means of the roller bearing 20, is free to rotate with respect to the coil compression spring 18 and the support base 16. Therefore, as long as the user remains seated on the seat 103, the user can rotate the seat 103 without restriction with respect to the foot area 12 around the axis A. At the same time, as a result of the renewed load and the related relative movement between the piston ring 54 and the guide tube 30, the piston ring 54 can be once again pushed onto the large diameter 58 of the graduated piston ring groove 56, so that the user can once again block the pneumatic spring 22 in any desired position by means of the first blocking means (i.e., preferably the check valve 44). Of course, the stop means of the second stop means unit (i.e., the first stop ring 64b and the second stop ring 68b) are no longer engaged.

Figure 2:
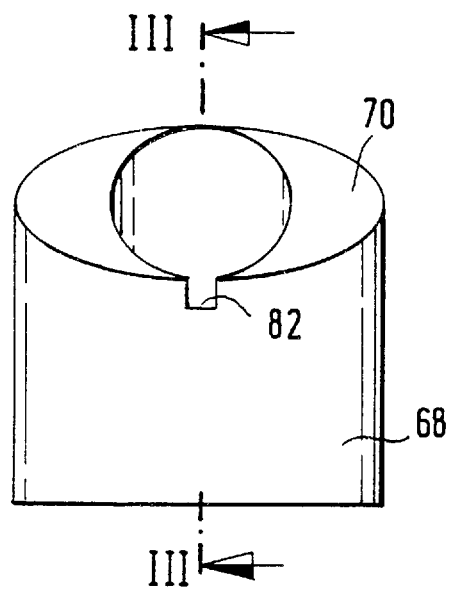
FIG. 2 and 3 are detailed illustrations of the stop means.
Figure 3:
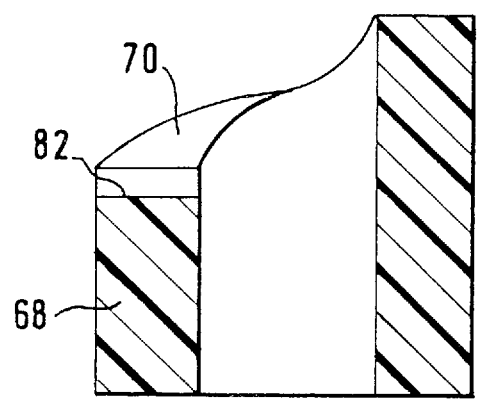

FIGS. 2 and 3 show a notch 82 in a second stop ring 68 (in accordance with one embodiment, the second stop ring 68 can correspond to the second stop ring 68a or the second stop ring 68b shown in FIG. 1). This notch 82 can correspond to a rib (not shown) on a first stop ring 64 (the first stop ring 64 can correspond to the first stop ring 64a or the first stop ring 64b shown in FIG. 1), so that in the specified angular position there is preferably a locking between the two stop rings 64 and 68, which is released only when a load of a specified magnitude is exerted on the seat 103 and thereby on the head area 52.

Figure 4:
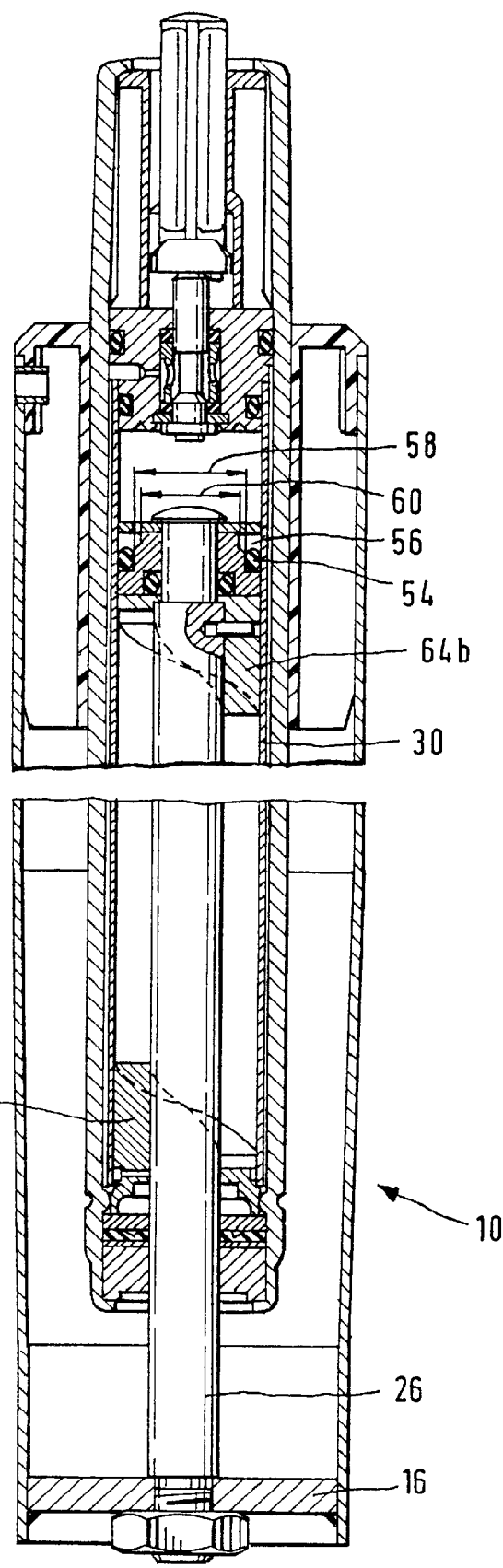
FIG. 4 shows an object carrier column which has a fixed piston rod.

FIG. 4 illustrates a preferably simplified embodiment of FIG. 1. The first stop means unit (i.e. first stop ring 64a and the second stop ring 68a) has preferably been eliminated by bolting the piston rod 26 directly to the support base 16. Consequently, there is always an orientation between the piston rod 26 and the vertical tube 10. The rotational movement takes place only between the piston ring 54 and the guide tube 30. Otherwise, the function of this embodiment with regard to the second blocking means (i.e., control ring 54, the piston ring groove 56, the large diameter 58 and the small diameter 60) and the second stop means unit (i.e., the first stop ring 64b and the second stop ring 68b) is preferably identical to that of the embodiment described above.

Figure 5:
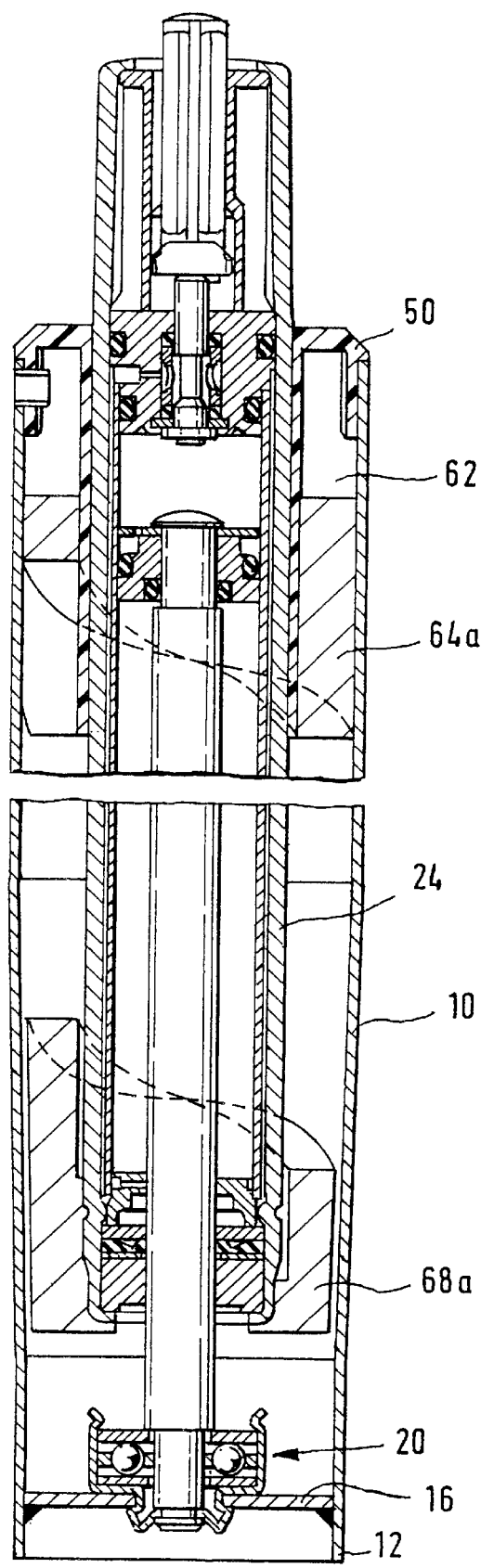
FIG. 5 shows an object carrier column which has stop means between the pressure cylinder and the vertical tube.

In FIG. 5, the same principle is used as in the other embodiments with regard to the blocking means. Preferably the only difference here is the use of a stop means unit (i.e., the first stop ring 64a and the second stop ring 68a) whereby a stop ring 64a is located in a stationary manner with respect to the vertical tube 10 and a stop ring 68a is located in a stationary manner with respect to the pressure cylinder 24. A ring-shaped chamber 62 which is formed by a guide lining 50 and the vertical tube 10 is thereby used to position the stop rings (i.e., the first stop ring 64a and the second stop ring 68a) in a favorable position with respect to a maximum stroke length. In this embodiment, the rotational position of the piston rod 26 essentially plays no role. Consequently, a roller bearing 20 can be used, so that the piston ring 54 is released from the rotational movement inside the pneumatic spring 22. The charge of compressed gas can act as the return means, corresponding to the coil compression spring 18 in FIG. 1.

Figure 6:
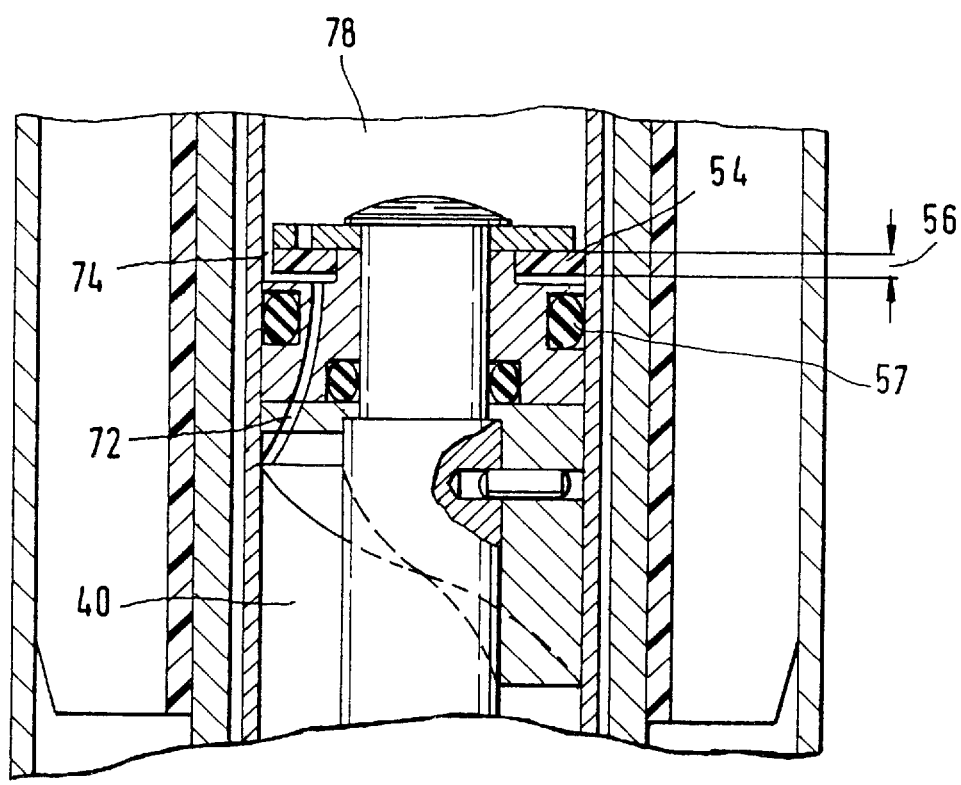
FIG. 6 shows an object carrier column with a separate control ring.
Figure 7:
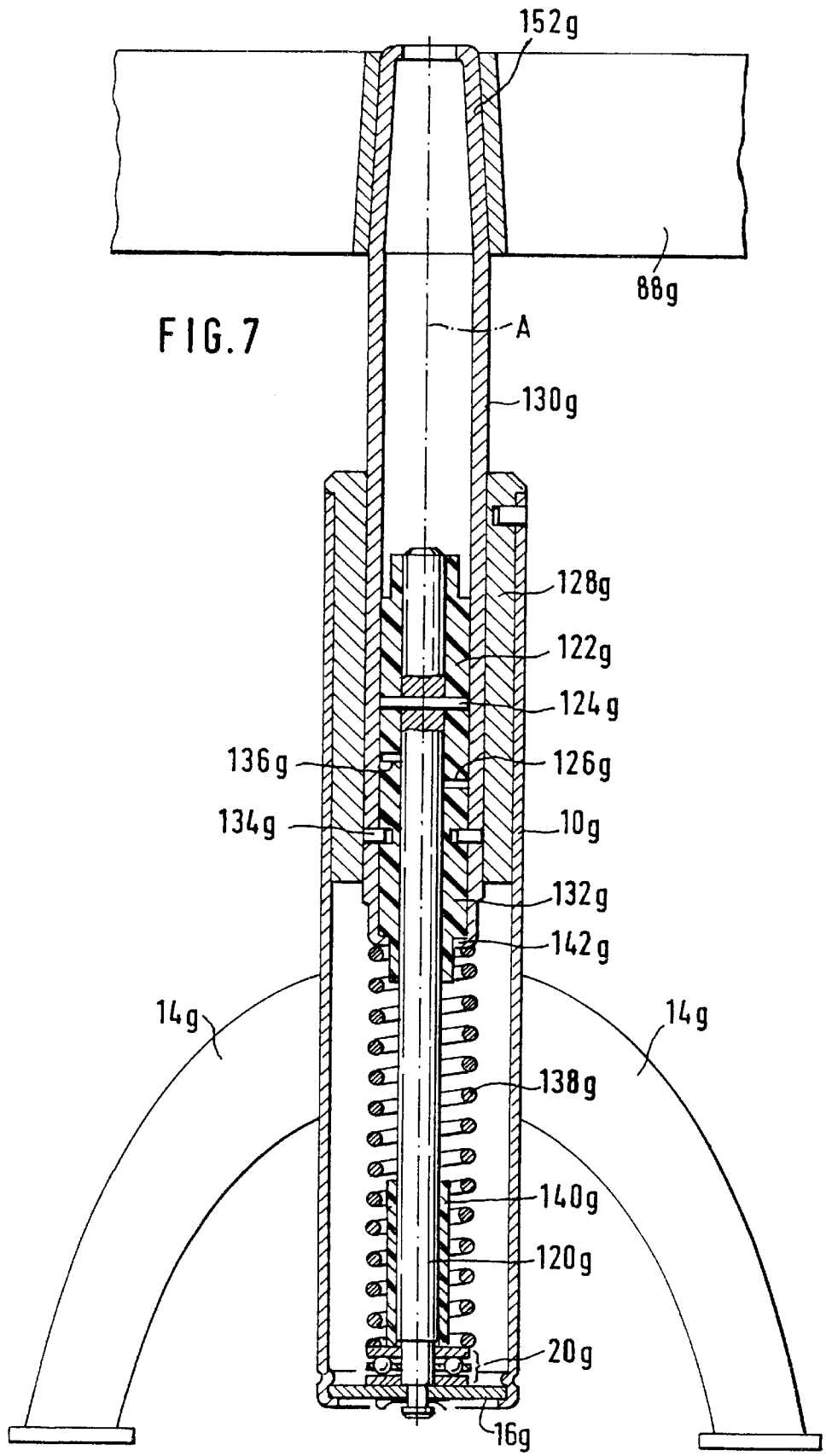
FIG. 7 shows a known chair column.

FIG. 6 illustrates a different embodiment of the second blocking means. Instead of an axially movable piston ring 54, a separate control ring 54 is used, which control ring 54 is actuated according to the same principle as described above. One difference is that the control ring 54 has a notch 74 which, together with the passage boring 72, connects the two work chambers, the first work chamber 38 (shown as work chamber 78 in FIG. 6) and the second work chamber 40, when the control ring 54 uncovers the opening of the throttle passage boring 72 inside the control groove 56. The piston ring 57 preferably does not need to execute any relative axial movement, and a constant bias can preferably be applied to it.

Individual features of the illustrated versions can be combined with one another, such as the stop means unit from FIG. 5 with the blocking means from FIG. 6.

It should also be understood that various types of spring devices or actuators could be substituted for the pneumatic spring 22 illustrated herein. Other examples of spring devices or actuators that could be adapted for use with the present invention include, but are not limited to, hydraulic, hydropneumatic, or spring-hydraulic actuators having a cylinder assembly and piston rod assembly which are coaxial to the telescope axis A.

One feature of the invention resides broadly in the object carrier column comprising a foot area and a head area which is connected to the foot area by a system of telescoping tubes which have a telescope axis A, whereby the foot area is non-rotationally connected to first stop means and the head area is non-rotationally connected to second stop means, whereby there are additional return means which act axially and apply a bias to the first and the second stop means to bring them axially closer together, whereby on the first stop means on the second stop means there are also interacting torque generating surfaces which, when there is axial contact between the first and the second stop means under the action of the return means, generate a torque around the telescope axis A between the head area and the foot area, such that this torque attempts to rotate the head area into a rest angle range with respect to the foot area, and attempts to hold the head area in this rest angle range, and whereby the second stop means can be separated from the first stop means when a specified axial load is applied on the head area, so that the torque-generating surfaces of the two stop means are separated from one another against the return action of the return means, and thereafter the head area is essentially free to rotate with respect to the foot area, characterized by the fact that the head area can be adjusted with respect to the foot area by height adjustment means to different rest height positions, whereby as the height adjustment means a hydraulic or hydropneumatic or spring-hydraulic or pneumatic actuator 22 with a cylinder assembly 24 and a piston rod assembly 26 which are coaxial to the telescope axis A is provided, whereby the height adjustment means 22 comprise internal bias means compressed gas in 38 and 40, and first blocking means 44 which can be adjusted as desired and second automatic blocking means 54; 56; 58; 60, whereby following a reduction of the load on the object carrier column, the second of the blocking means are released and the height adjustment means 22 automatically move closer to a specified limit position, and the stop means 64a; 68a; 64b; 18 move the object carrier column into the specified rest angle range.

Another feature of the invention resides broadly in the object carrier column characterized by the fact that the second blocking means 54; 56; 58; 60 are effectively connected in parallel to the first blocking means 44.

Yet another feature of the invention resides broadly in the object carrier column characterized by the fact that the second blocking means comprises of a friction-actuated, axially-movable control ring 54 inside a control groove 56, which controls a flow connection 72 between the two work chambers 38; 40 as a function of the direction of the load.

Still another feature of the invention resides broadly in the object carrier column characterized by the fact that the control ring has a recess 74, by means of which, when the control ring is in the open position, the two work chambers are connected.

A further feature of the invention resides broadly in the object carrier column characterized by the fact that the control ring is realized in the form of a piston ring.

Another feature of the invention resides broadly in the object carrier column characterized by the fact that the piston ring is located inside a control groove realized in the form of a graduated piston ring groove 56, whereby the larger diameter 58 of the piston ring groove, by means of the piston ring, blocks the connection between the two work chambers, and the piston ring, in the event of a relative movement on account of a load between the guide tube and the piston ring, is moved from the larger diameter to the smaller diameter 60 of the piston ring groove.

Yet another feature of the invention resides broadly in the object carrier column characterized by the fact that two stop means units 64a; 68a; 64b; 68b are used, one of which is located inside the actuator and the other of which is effectively located between the piston rod and the underside of the support base 16.

Still another feature of the invention resides broadly in the object carrier column characterized by the fact that the first stop means is effectively connected to the vertical tube and the second stop means is effectively connected to the pressure cylinder.

A further feature of the invention resides broadly in the object carrier column characterized by the fact that a guide lining 50 for the actuator 22 and the vertical tube form a ring-shaped chamber 62, in which the stop means 64*a* is located.

Another feature of the invention resides broadly in the object carrier column characterized by the fact that at least one of the torque-generating surfaces 66, 70 is inclined with respect to an axially-normal reference surface in the peripheral direction around the telescope axis A.

Yet another feature of the invention resides broadly in the object carrier column characterized by the fact that between the head area or cone 52 and the foot area 12 there is roller bearing means 20 which transmit an axial load from the head area 52 to the foot area 12.

Still another feature of the invention resides broadly in the object carrier column characterized by the fact that the return means 18 which transmits the axial force is supported oil a support base 16 which is axially non-detachably and non-rotationally connected to the base area 12, and that one 26 of the two assemblies 24, 26—i.e. the piston rod assembly 26 and the cylinder assembly 24—is supported on the return means 18 which transmit the axial force, while the other 24 of the two assemblies 24, 26 is connected to the head area 52 so that it cannot move axially.

A further feature of the invention resides broadly in the object carrier column characterized by the fact that the first stop means 64*a* is non-rotationally located on an underside of the support base 16, that the one assembly 26 has an extension 28 which is non-rotational relative to it, which extension 28 runs through the return means 18 which transmit the axial force, the support base 16 and the first stop means 64, and that the second stop means 68*a* are non-rotationally attached to this extension 28 below the first stop means 64*a*.

Another feature of the invention resides broadly in the object carrier column characterized by the fact that between the upper end of the return means 18 which transmits the axial force and the one assembly 26 there is a pivot bearing 20 which transmits an axial force.

Yet another feature of the invention resides broadly in the object carrier column characterized by the fact that on an upper end of the cylinder assembly 24 there is a release element 46 which initiates a relative movement between the piston rod assembly 26 and the cylinder assembly 24.

Still another feature of the invention resides broadly in the object carrier column characterized by the fact that the return means 18 which transmit the axial force are realized in the form of a coil compression spring.

Examples of chairs or chair columns which could possibly be used or possibly be adapted for use in the context of the present invention might be disclosed by the following U.S. Patents Nos., all of which are assigned to the assignee of the present invention: No. 5,443,573, No. 5,433,409, No. 5,397,111, No. 5,377,942 and No. 5,131,615.

Further examples of chairs or chair columns which could possibly be used or possibly be adapted for use in the context of the present invention, along with additional components generally associated with chairs or chair columns, which might be interchangeable with, or adaptable as, components of the embodiments as described hereinabove, might be disclosed by the following U.S. Pat. Nos.: 5,234,187, No. 5,213,295, No. 5,192,114, No. 5,106,157 and No 4,872,635.

Federal Republic of Germany Patent Application No. 195 28 649.9 filed on Aug. 4, 1995 entitled "Stuhl mit Rückenlehnenrückstellung" and corresponding patent documents DE-OS 195 28 649.9 and DE-PS 195 28 649.9 are hereby expressly incorporated by reference as if fully set forth herein.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A chair column for a height-adjustable revolving chair, said chair column having a longitudinal axis, said chair column comprising:

an adjustable-length assembly;
    said adjustable-length assembly comprising:
        a first end;
        a second end;
        a first tube member rotatable about the longitudinal axis;
        said first tube member being translatable along the longitudinal axis;
        said first tube member comprising a first portion;
        said first portion comprising said first end of said adjustable-length assembly;
        said first portion comprising structure to attach a chair seat;

a second tube member;
said second tube member comprising a second portion;
said second portion comprising said second end;
said second portion comprising structure to attach to a chair base; and
said second tube member comprising apparatus to guide the axial and rotational movement of said first tube member;
biasing structure to urge said first end away from said second end;
a blocking device to limit retraction of said adjustable-length assembly upon application of a substantially axial load directed from said first portion towards said second portion;
a height-adjustment device to adjust the retraction of said adjustable-length assembly while under the axial load;
a stopping device to limit the extension of said adjustable-length assembly by said biasing structure upon removal of the axial load;
said stopping device comprising a return device;
said return device comprising apparatus to rotate said first tube member to a fixed angular position with respect to said second tube member upon the removal of the axial load;
said biasing structure comprising a pressure cylinder device;
said pressure cylinder device comprising:
  said first tube member;
  said first tube member comprising a pressure cylinder;
  a piston;
  said piston being disposed within said pressure cylinder;
  said piston being disposed to separate said pressure cylinder into a first work chamber and a second work chamber;
  structure to seal the ends of said first work chamber and said second work chamber;
  each of said first work chamber and said second work chamber containing an operating fluid;
  a flow connection disposed to fluidly connect said first work chamber and said second work chamber;
said pressure cylinder device comprising said blocking device;
said blocking device comprising:
  structure to close said flow connection upon retraction of said adjustable-length assembly;
  structure to open said flow connection upon extension of said adjustable-length assembly;
said blocking device being a first blocking device;
said pressure cylinder device comprising said height-adjustment device; and
said height-adjustment device comprising:
  a second blocking device to close said flow connection; and
  said second blocking device comprising structure to open and close said flow connection.

2. The chair column according to claim 1, wherein:
said first work chamber is disposed between said piston and said first end of said adjustable-length assembly;
said flow connection comprises a first flow connection and a second flow connection;
said first flow connection is operatively connected in parallel with said second flow connection;
said first blocking device comprises said first flow second connection;
said second blocking device comprises said second flow connection;
said first blocking device and said second blocking device are disposed to operatively act in parallel;
said second blocking device comprises a valve to selectively open and close said second flow connection;
said valve is disposed on an opposite side of said first work chamber from said piston;
said piston comprises:
  a first portion and a second portion;
  said first portion of said piston is disposed immediately adjacent said first work chamber;
  said second portion of said piston is disposed immediately adjacent said second work chamber;
  a control portion;
  said control portion is disposed between said first portion and said second portion of said piston;
  said control portion comprises at least one tubular portion;
  said pressure cylinder comprises an inside diameter; and
  said at least one tubular portion has an outside diameter substantially less than said inside diameter of said pressure cylinder;
said inside diameter of said pressure cylinder and said outside diameter of said at least one tubular portion of said control portion form an annular groove;
said first blocking device comprises a control ring;
said control ring is disposed within said annular groove;
said control ring is disposed about said control portion of said piston;
said control ring is disposed in frictional contact with the inside diameter of said pressure cylinder;
said frictional contact of said control ring operatively forcing said control ring into a first longitudinal position with respect to said control portion of said piston for closing said first flow connection upon extension of said adjustable-length assembly; and
said frictional contact of said control ring operatively displacing said control ring into a second longitudinal position with respect to said control portion of said piston for opening said first flow connection upon retraction of said adjustable-length assembly.

3. The chair column according to claim 2, wherein:
said first blocking device further comprises one of the following A) and B):
  A) a first flow control structure; said first flow control structure comprises:
    said at least one tubular portion of said piston control portion comprising a first tubular portion and a second tubular portion;
    said first tubular portion being disposed adjacent said first portion of said piston;
    said first tubular portion having an outside diameter;
    said second tubular portion being disposed adjacent said second portion of said piston;
    said second tubular portion having an outside diameter;
    the outside diameter of said first tubular portion being substantially less than the outside diameter of said second tubular portion;
    said first flow connection comprising a bore;
    said bore extending through said first portion of said piston between said first work chamber and said annular groove;

said control ring being disposed about said first tubular portion upon being displaced into said first longitudinal position; and said control ring being disposed about said second tubular portion upon being displaced into said second longitudinal position;

B) a second flow control structure;

said second flow control structure comprises:

said at least one control portion of said piston being a sole control portion;

said control ring comprising a recess;

said recess of said control ring being disposed at an outer peripheral surface of said control ring; and said first flow connection comprising:

a first passage disposed in said first portion of said piston;

said first passage extending between said first work chamber and said annular groove;

said recess of said control ring; and a second passage disposed between said second work chamber and said annular groove.

4. The chair column according to claim 3, wherein:

said stopping device comprises a first stop ring and a second stop ring;

said first stop ring is non-rotationally attached to said first tube member;

said second stop ring is non-rotationally attached to said second tube member;

said first and second stop rings are disposed to cooperatively limit the maximum extension of said adjustable-length assembly upon removal of the axial load;

said first and second stop rings are disposed to operatively engage one another to rotate said first tube member to a fixed angular position with respect to said second tube member;

each of said first stop ring and said second stop ring comprise a rotation-generating surface to generate torque to rotate said first and second stop rings relative to one another about the longitudinal axis during the operative engagement of said first and second stop rings with one another;

said rotation-generating surface of said first stop ring faces said rotation-generating surface of said second stop ring;

a substantial portion of at least one of said first stop ring rotation-generating surface and said second stop ring rotation-generating surface is inclined with respect to a plane perpendicular to the longitudinal axis; and said return device comprises said rotation-generating surfaces of said first stop ring and said second stop ring.

5. The chair column according to claim 4, wherein:

said pressure cylinder device comprises a piston rod;

said piston rod is disposed concentrically about the longitudinal axis;

said piston rod is fixedly attached to said second portion of said piston;

said piston rod extends through said second work chamber;

said adjustable-length assembly further comprises a support plate to transfer a substantially axial load from said first tube member to said second tube member;

said support plate is fixedly connected to said second tube member;

said support plate is disposed within said second tube member between said second end of said adjustable-length assembly and said first tube member;

said support plate is disposed generally perpendicular to the longitudinal axis; and said biasing structure comprises at least one of C) and D):

C) operating fluid disposed in said second work chamber; and

D) a coil compression spring;

said coil compression spring being operatively connected between said support plate and said first tube member to bias said first tube member away from said support plate along the longitudinal axis;

said support plate being disposed to transfer a longitudinal force between said coil compression spring and said second tube member; and structure to transfer a longitudinal force between said coil compression spring and said first tube member.

6. The chair column according to claim 5, wherein:

said support plate comprises a first side and an axially opposite second side;

said piston is disposed on said first side of said support plate;

said support plate comprises a through-hole oriented concentrically about the longitudinal axis;

said piston rod comprises a piston rod extension;

said piston rod extension is oriented concentrically about the longitudinal axis;

said piston rod extension extends from said piston rod through said support plate through-hole;

a substantial portion of said piston rod extension is disposed on said second side of said support plate;

said biasing structure comprises said coil compression spring;

said structure to transfer a longitudinal force between said coil compression spring and said first tube member comprises:

said piston rod comprising a roller bearing portion disposed concentrically about the longitudinal axis;

said roller bearing portion being disposed between said piston rod and said piston rod extension;

a roller bearing disposed between said coil compression spring and said piston rod to abut said piston rod;

said roller bearing being disposed about said roller bearing portion of said piston rod;

said coil compression spring being operatively disposed between said roller bearing and said support plate; and said roller bearing being disposed to transfer a substantially longitudinal force between said coil compression spring and said piston rod;

said stopping device comprises a first stop unit and a second stop unit;

said first stop unit comprises:

said first stop ring disposed within said second work chamber;

said first stop ring being fixedly attached to said pressure cylinder;

said first stop ring being slidingly disposed about said piston rod;

a third stop ring fixedly attached about said piston rod extension;

said third stop ring being disposed on said second side of said support plate; and said first stop ring and said third stop ring being disposed to cooperatively rotate said first tube member to a fixed angular position with respect to said piston rod upon removal of the axial load; said
second stop unit comprises:
said second stop ring disposed between said support
plate and said third stop ring;
said second stop ring being fixedly attached to said
second side of said support plate;
said second stop ring being slidingly disposed about
said piston rod extension;
a fourth stop ring slidingly disposed within said
second work chamber;
said fourth stop ring being fixedly attached about
said piston rod; and
said second stop ring and said fourth stop ring being
disposed to cooperatively rotate said piston rod to
a fixed angular position with respect to said second tube member upon removal of the axial load.

7. The chair column according to claim 5, wherein:
said first tube member and said second tube member are
disposed to form an annular chamber between said first
tube member and said second tube member;
said first stop ring is slidingly disposed within said second
tube member;
said first stop ring is fixedly attached about said first tube
member;
said second stop ring is fixedly attached within said
second tube member;
said second stop ring is slidingly disposed about said first
tube member;
said piston rod comprises a piston rod extension disposed
concentrically about the longitudinal axis;
said piston rod extension extends from said piston rod to
said support base;
said adjustable-length assembly comprises structure to
attach an end portion of said piston rod extension to
said support plate to prevent relative axial displacement
between said piston rod and said second tube member;
and
said structure to attach an end portion of said piston rod
extension comprises:
a roller bearing axially fixed to said support plate;
said roller bearing being operatively disposed about
said end portion of said piston rod extension; and
said roller bearing being disposed to transfer a substantially longitudinal load from said piston rod to said
support plate.

8. The chair column according to claim 5, wherein:
said piston rod is axially fixed to said support plate;
each of said first stop ring and said second stop ring is
disposed within said second working chamber;
said first stop ring is slidingly disposed about said piston
rod;
said first stop ring is fixedly attached to said cylinder;
said second stop ring is slidingly disposed within said
second work chamber; and
said second stop ring is fixedly attached about said piston
rod.

9. A height-adjustable support column as for supporting a
seat of a chair, said support column comprising:
a first portion;
said first portion comprising structure to attach a chair
seat;
said first portion being disposed about a longitudinal axis;
the longitudinal axis being an axis of rotation of said first
portion;
a second portion;
said second portion comprising structure to attach to a
chair base;
said first portion being non-rotatably connected to said
second portion upon said first portion being disposed in
a first longitudinal position upon the chair seat being
unoccupied;
said first portion being rotatable connected to said second
portion upon said first portion being disposed in a
second longitudinal position upon the chair seat being
occupied;
said rotatable connection comprising structure to rotate
the chair seat about a chair base to any desired angular
seating position;
the second longitudinal position corresponding to a seating height of the chair seat;
a height-adjustment device to adjust the second longitudinal position to adjust the seating height of the chair
seat;
first returning apparatus to return said first portion from
the second longitudinal position to the first longitudinal
position upon the chair seat being unoccupied; and
said first returning apparatus comprising second returning
apparatus to return said first portion to a predetermined
angular position relative to said second portion upon
the first portion being displaced to the first longitudinal
position;
said height-adjustment device comprising blocking apparatus to limit the longitudinal displacement of said first
portion from the first longitudinal position to the second longitudinal position upon the chair seat being
occupied;
said first returning apparatus comprising a stopping
device to limit the longitudinal displacement of said
first portion from the second longitudinal position to
the first longitudinal position upon the chair seat being
unoccupied;
said height-adjustment device comprising a fluid actuation device;
said fluid actuation device comprising a cylinder having
an inside diameter;
said cylinder being disposed concentrically about the
longitudinal axis;
said fluid actuation device comprising a piston;
said piston being disposed concentrically about the longitudinal axis;
said piston being disposed within said cylinder;
said piston being disposed to divide said cylinder into a
first work chamber and a second work chamber;
each of said first work chamber and said second work
chamber comprising structure to contain a pressurizing
fluid of said fluid actuation device;
said blocking apparatus comprising structure to seal said
first work chamber from said second work chamber;
said piston being disposed in a first longitudinal position
with respect to said cylinder upon the chair seat being
occupied;
said piston being disposed in a second longitudinal position with respect to said cylinder upon the chair seat
being unoccupied;
said fluid actuation device comprising a valve;
said valve comprising structure to selectively seal said
first work chamber from said second work chamber;

said valve comprising structure to selectively unseal said first work chamber from said second work chamber;

said structure to selectively unseal said first work chamber from said second work chamber comprising apparatus to adjust the seating height of the chair;

said blocking apparatus comprising a first blocking structure and a second blocking structure;

said first blocking structure being disposed to operate in parallel with said second blocking structure;

said first blocking structure comprising said structure to selectively seal said first work chamber from said second work chamber;

said second blocking structure comprising structure to bypass said blocking apparatus upon the chair seat being unoccupied;

said bypass structure comprising:
- a flow connection to pressurize fluid communication between said first work chamber and said second work chamber;
- said flow connection comprising:
  - said piston comprising at least one control diameter;
  - said inside diameter of said cylinder and said at least one control diameter of said piston being disposed to form a control groove;
  - a first bore disposed in said piston, said first bore extending between said first work chamber and said control groove; and
  - a second bore disposed in said piston, said second bore extending between said control groove and said second work chamber;
- a control device to seal and unseal said flow connection;
- said control device being disposed within said control groove;
- apparatus to longitudinally displace said control device to a sealing position to seal said flow connection upon the chair seat being occupied; and
- apparatus to longitudinally displace said control device to an unsealing position to unseal said flow connection and to bypass said blocking apparatus upon the chair seat being unoccupied.

10. The support column according to claim 9, wherein:

said control device to seal and unseal said flow connection comprises a control ring;

said control ring is disposed in frictional contact with the inner diameter of said cylinder;

said second blocking structure bypass structure comprises one of: A) first bypass apparatus and B) second bypass apparatus:
- A) said first bypass apparatus comprising:
  - said control ring;
  - said at least one control diameter of said piston comprising a first control diameter and a second control diameter;
  - said first control diameter being substantially larger than said second control diameter;
  - said frictional contact comprising structure to longitudinally displace said control ring to a sealing position about said first control diameter upon the chair seat being occupied;
  - said frictional contact comprising structure to longitudinally displace said control ring to an unsealed position about said second control diameter upon the chair seat being unoccupied; and
- B) said second bypass apparatus comprising:
  - said control ring;
  - said control ring comprising a recess;
  - said control ring recess comprising structure to unseal said flow control device;
  - said frictional contact comprising structure to longitudinally displace said control ring to a sealing position about said at least one control diameter upon the chair seat being occupied;
  - said frictional contact comprising structure to longitudinally displace said control ring to an unsealed position about said at least one control diameter upon the chair seat being unoccupied.

11. The support column according to claim 10, wherein:

said stopping device comprises a first stop and a second stop;

said first stop is non-rotatively connected to said first portion of said support column;

said second stop is non-rotatively connected to said second portion of said support column;

said first stop and said second stop each comprise apparatus to non-rotatively connect said first stop and said second stop to one another in an angular orientation corresponding to the predetermined angular orientation of the chair seat;

said first stop and said second stop comprise apparatus to apply torque about the longitudinal axis to said first portion of said seat column upon engagement of said first stop with said second stop;

said first stop comprises a first torque-generating surface to generate torque about the longitudinal axis;

said second stop comprises a second torque-generating surface to generate torque about the longitudinal axis;

a substantial portion of at least one of said first and second torque-generating surfaces is inclined with respect to a plane perpendicular to the longitudinal axis; and said second returning apparatus comprises said apparatus to apply torque.

12. The support column according to claim 11, wherein:

said first returning apparatus comprises a biasing structure to urge operative engagement of said first stop with said second stop upon the chair seat being unoccupied;

said first stop is disposed to engage said second stop in a first longitudinal position upon the chair seat being unoccupied to prevent relative rotation between said first and second portions of said support column;

said first stop is disposed to be disengaged with said second stop in a second longitudinal position upon the chair seat being occupied to permit relative rotation between said first and second portions of said support column;

said first stop is disposed to be initially disengaged with said second stop in a third longitudinal position upon a predetermined longitudinal load being applied to said support column by the chair seat; and each of said first torque-generating surface and said second torque-generating surface are configured to generate torque upon said first stop being longitudinally displaced from the third longitudinal position of said first stop to the first longitudinal position of said first stop.

13. The support column according to claim 12, wherein:

said second portion of said support column comprises a support base to transfer a longitudinal load from said first portion of said support column to said second portion of said support column;

said support base is fixedly disposed within said second portion of said support column; and said return apparatus comprises at least one of A) and B):
  A) pressure medium disposed in said second work chamber; and
  B) a coil compression spring;
    said coil compression spring is operatively disposed between said support plate and said first portion of said support column to bias said first portion of said support column away from said support plate along the longitudinal axis;
    a support plate is disposed to transfer a longitudinal force between said coil compression spring and said second portion of said support column; and
    apparatus to transfer a longitudinal force between said coil compression spring and said first portion of said support column.

14. The support column according to claim 13, wherein:
said support base is disposed generally perpendicular to the longitudinal axis;
said support base comprises a bore oriented concentrically about the longitudinal axis;
a piston rod comprises a piston rod extension disposed concentrically about the longitudinal axis;
said piston rod extension extends from said piston rod through said support base bore;
a substantial portion of said piston rod extension is disposed on the side of said support plate opposite said piston;
said cylinder is fixedly attached to said first portion of said support column;
said biasing structure comprises item B);
said apparatus to transfer a longitudinal force between said coil compression spring and said first portion of said support column comprises:
  said piston rod comprises a roller bearing portion disposed concentrically about the longitudinal axis;
  said roller bearing portion is disposed between said piston rod extension and the remainder of said piston rod;
  a roller bearing disposed about said roller bearing portion to abut said piston rod;
  said coil compression spring is operatively connected between said support plate and said roller bearing; and
  said roller bearing is disposed to transfer a longitudinal force between said coil compression spring and said piston rod;
said first stop comprises:
  a first stop ring disposed in said second work chamber;
  said first stop ring is fixedly attached to said cylinder;
  a second stop ring fixedly attached to said piston rod extension;
  said second stop ring is disposed on the opposite side of said support plate from said first stop ring;
  said first torque-generating surface comprises a surface of said first stop ring and a surface of said second stop ring;
said second stop comprises:
  a third stop ring disposed in said second work chamber;
  said third stop ring is fixedly attached to said piston rod;
  a fourth stop ring fixedly attached to said support plate;
  said fourth stop ring is disposed between said support plate and said second stop ring; and
  said second torque-generating surface comprises a surface of said third stop ring and a surface of said fourth stop ring.

15. The support column according to claim 13, wherein:
a piston rod comprises a piston rod extension;
said piston rod extension is oriented concentrically about the longitudinal axis;
said piston rod extension extends from said piston rod to said support base;
an end portion of said piston rod extension is attached to said support plate to prevent relative axial displacement between said piston rod and said second portion of said support column;
said first portion of said support column comprises said cylinder;
said first stop comprises a first stop ring slidingly disposed in said second work chamber;
said first stop ring is fixedly attached about said piston rod;
said second stop comprises a second stop ring slidingly disposed about said piston rod in said second work chamber; and
said second stop ring is fixedly attached to said cylinder.

16. The support column according to claim 13, wherein:
said first portion of said support column comprises said cylinder;
a piston rod comprises a piston rod extension;
said piston rod extension is oriented concentrically about the longitudinal axis;
said piston rod extension extends from said piston rod to said support base;
said support column comprises structure to attach an end portion of said piston rod extension to said support plate to prevent relative axial displacement between said piston rod and said second portion of said support column;
said structure to attach said piston rod extension comprises:
  a roller bearing disposed about said piston rod extension to transmit a longitudinal force from said piston rod to said support plate;
  said roller bearing is supported by said support plate to prevent relative axial displacement of said piston rod towards said support plate; and
  said piston rod extension is attached to said support rod to prevent relative displacement of said piston rod away from said support plate;
said second portion of said support column comprises a tubular member;
said tubular member is disposed concentrically about said first portion of said support column to form a chamber between said first portion and said tubular member;
said first stop comprises a first stop ring;
said first stop ring is slidingly disposed about said first portion of said support column within said chamber;
said first stop ring is fixedly attached within said tubular member;
said second stop comprises a second stop ring;
said second stop ring is slidingly disposed within said tubular member; and
said second stop ring is fixedly attached about said first portion of said support member.

* * * * *

UNITED STATES PATENT AND TRADEMARK OFFICE
CERTIFICATE OF CORRECTION

PATENT NO. : 5,806,828
DATED : September 15, 1998
INVENTOR(S) : Wolfgang ROTHE, Klaus KOCH, Michael HEWEL, and Oliver SCHÜTTLER It is certified that error appears in the above-identified patent and that said Letters Patent is hereby corrected as shown below:

In column 6, line 50, delete '105.' and insert --105 (see FIG. 8).--.

In column 13, line 66, Claim 2, after 'flow', delete "second".

In column 18, line 8, Claim 9, after 'being', delete "rotatable" and insert --rotatably--.

Signed and Sealed this

Twenty-second Day of June, 1999

Attest:

*Attesting Officer*

Q. TODD DICKINSON

*Acting Commissioner of Patents and Trademarks*